This invention relates to articles of cutlery and particularly a knife assembly of the type wherein a blade member is provided with a tang portion having parallel side faces which generally define a thickness equal to the thickness of the stock from which the blade is fabricated and a handle member of molded synthetic resinous composition having a recess in which the tang portion is contained and secured by filling the recess about the tang with a suitable adhesive material.

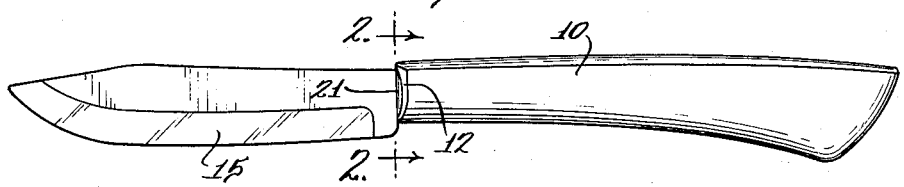
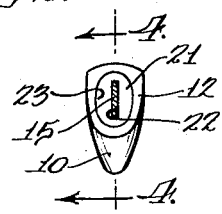
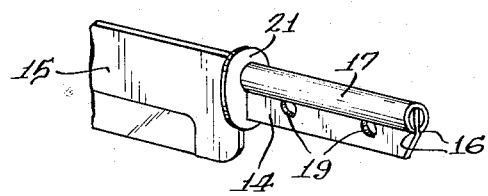
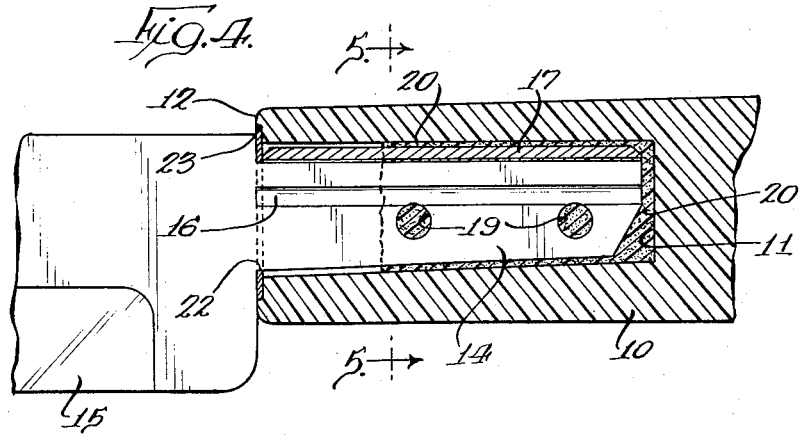
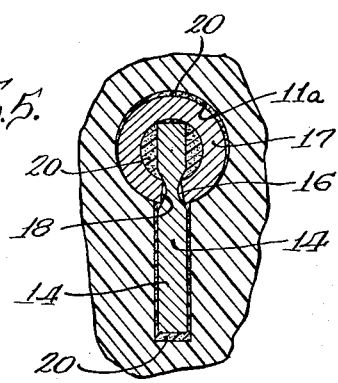
INVENTOR:
Richard T. Kennedy
BY 3,114,973
KNIFE ASSEMBLY
Richard T. Kennedy, Oak Lawn, Ill., assignor to Ekco
Products Company, Chicago, Ill., a corporation of Delaware
Filed Apr. 25, 1962, Ser. No. 190,054
1 Claim. (Cl. 30—342)

The production of handles of molded synthetic resinous composition with a recess matching the transverse cross sectional contour of a tang defined by a flat axial extension of the blade requires use of a recess forming core element of such limited thickness as to frequently undergo deflection under pressure applied thereto by the flow of the molding material about said core element. Such deflection causes misalignment of the recess axially of the handle which would interfere with proper assembly of the blade member and the handle.

In addition to the foregoing imperfections, the handle was susceptible to breakage or splitting along lines of concentrated pressure exerted by the axially extending upper and lower edges of the tang in performing cutting tasks with a knife assembly of this character.

It is accordingly an object of this invention to overcome these difficulties in a knife assembly as indicated by the use of an enlarged edging unit arranged in straddling relation to an axially extending edge portion of the tang and thereby spread the forces applied by said edge portion of the tang over a relatively broad front so as to lessen the strain on the handle. In providing a cored recess in the handle to accommodate such enlarged edging unit, the coring element is correspondingly enlarged along a line effective to prevent deflection of the core element by the flow of the molding material in the production of the handle so as to facilitate control in maintaining accurate alignment of the recess axially of the handle during such production.

It is a further object of this invention to provide a knife assembly which is simple and economical in cost and highly attractive in appearance.

These and other more specific objects will become more apparent and the invention itself will be best understood by reference to the following description of an embodiment of the invention taken in conjunction with the accompanying drawing.

An embodiment of the knife assembly of this invention as illustrated in the accompanying drawing and described in detail in the following specification is set forth by way of example only and it is to be understood that the principles of the invention are not limited precisely thereto, excepting as defined in the appended claims.

In the drawing:

FIG. 1 is a side elevation of a knife assembly embodying one form of the present invention.

FIG. 2 is a section taken along line 2—2 of FIG. 1 at the junction of the handle and blade.

FIG. 3 is a fragmentary perspective view showing details of the tang of the blade and the channel member fitted thereon.

FIG. 4 is an enlarged fragmentary section taken along line 4—4 of FIG. 2.

FIG. 5 is an enlarged fragmentary section taken along line 5—5 of FIG. 4.

As shown in FIG. 1, the present invention is embodied in a knife assembly which includes a handle member 10 which may be made of any suitable hard molded synthetic resinous material such, for example, as melamine, phenolic condensation composition or thermoplastic material. Reference numeral 11 designates a molded recess which extends rearwardly from the front face 12 of the handle 10 a selected distance short of the rear limits of the handle. The upper and lower edges of the recess are tapered slightly along rearwardly converging lines. The opposite side walls of recess 11 occupy parallel planes throughout the vertical dimension of the recess 11 except for an upper marginal portion 11a defining a cavity of substantially circular cross sectional contour conforming to the curvature of a cylinder having its axis extending lengthwise of the longitudinal axis of the handle 10 and having a diameter at least three times the thickness of the recess 11 measured between said parallel side wall surfaces.

The blade member includes a tang 14 forming a rearward extension of a cutting blade 15. The tang 14 presents opposed upright side faces which generally define a thickness equal to the thickness of the stock from which the blade 15 is fabricated. The upper and lower edges of the tang are also tapered along rearwardly converging lines in substantially symmetrical relation to the surfaces of the recess 11 above and below the tang. When the tang 14 occupies an installed position in the recess 11, as shown in FIG. 4, the tang 14 is supported in a predetermined position relative to the parallel side walls of the recess 11 and the bottom of the recess 11 by means of an inverted channel member 17 which straddles the upper marginal portion of the tang 14 within the area of the cylindrical cavity 11a forming the upper limits of the recess 11. The member 17, preferably of sheet metal construction, is bent along lines of curvature substantially conforming to the contour of the cavity 11a. Thus the member 17 provides a continuous enlarged tubular edging unit having downward engagement with upwardly facing surfaces of the cavity 11a along its junction with the parallel side walls of the recess 11. Lips 18 defined by opposite lower edge portions of the member 17 are received by grooves 16 formed in opposite face portions of the tang 14. The member 17 is inherently stressed to normally position the lips 18 at a lesser distance apart than the thickness of the tang 14 measured at the area thereof between deepest portions of the grooves 16. Hence, the lips 18 are forced apart a distance sufficient to have sliding fit in the grooves 16 for the purpose of initially fitting the member 17 in operative relation to the tang 14 by moving the member 17 endwise along the grooves 16. After being so fitted on the tang 14, the member 17 is positively held against movement relative to the tang 14 by the gripping action of the lips 18 against the surface of the grooves 16 engaged thereby due to inherent stress of the member 17. It will be noted from FIG. 5 that the member 17 is of such dimension as to define an area of clearance substantially equal to the thickness of the tang 14 between the inner surface of the member 17 and the surface of the side of the tang opposite thereto. While the member 17 and the tang 14 engaged thereby are thus supported within the recess 11 and cavity 11a, the area of clearance between the surfaces of the recess and cavity and between the surfaces of the member 17 and the portion of the tang 14 contained therein is filled with an uncured adhesive composition 20 of suitable resistance to water, heat and grease, such as an epoxy cement, to provide a securely bonded connection between the handle and the tang of the blade when said composition is in a cured state. It will be noted that the composition 20 also fills holes 19 provided in the tang 14 as well as the space between the inner surfaces of the member 17 and the portion of the tang 14 confined within the member 17 to establish a keyed interconnection with the tang 14.

A bolster member 21 having an opening 22 through which the tang 14 extends is rigidly clamped in fixed position between shoulders 15a at the junction between the blade 15 and tang 14 and the front end of member 17. When the tang 14 and the member 17 are fully installed in the handle 10 as shown in FIGS. 1, 2 and 4, the bolster member occupies a depression 23 in the front end face 12 of the handle 10 so as to maintain the exposed face of the bolster member flush with the end surface 12 of the handle. The bolster member accordingly conceals the entrance of recess 11 and cavity 11a as well as the member 17 so as to provide a trim appearance at the junction of the blade and the front end of the handle. The relatively contoured interengaging edges of the bolster member 17 and the depression 23 in the handle 10 also aid in holding the handle 10 and the blade 15 in a predetermined angularly oriented position about the longitudinal axis of the handle.

It will be observed that a knife assembly incorporating the features of this invention as hereinbefore described provides an article which is relatively simple and inexpensive to manufacture and, at the same time, achieves the desired combination of a knife having a handle in which the tang of the blade is fully concealed and securely held without inducing localized pressure on the portion of the handle along the axially extending edges of the tang so as to avoid a splitting or breaking thereof incidental to the use of the knife in actual cutting service.

What is claimed is:

A knife assembly having a blade member and an integral extension defining a tang having a thickness corresponding to the thickness of the stock from which the blade member is fabricated, a molded handle of synthetic resinous composition, said handle having a preformed recess extending rearwardly from the front face of the handle along the longitudinal axis of the handle in which said tang of the blade member is receivable, said recess having relatively flat upright side walls conforming to the contour of said tang except for an upper marginal portion of said recess defining a cavity of substantially circular cross-sectional contour conforming to the curvature of a cylinder having its axis in upward vertical alignment with the longitudinal axis of the handle and a diameter at least three times the distance between said flat side walls of the recess so as to define upwardly facing shoulders along surfaces of said cavity adjoining the junction of said cavity with said flat side walls, an inverted channel member totally confined within said cavity and so conforming to the contour of said cavity as to have downward engagement with said shoulders, and lips defined by the lower limits of said channel member between which the upper marginal portion of the tang is engaged and rigidly secured via stresses inherent with said channel member whereby the position of said tang in a vertical plane containing the longitudinal axis of the handle is established via said channel member and the shoulders with which said channel member has downward engagement, a bolster plate closing the entrance to said recess except for an opening in said plate through which the tang of the blade forward of said channel member extends, a depression in the front face of the handle surrounding the entrance to said recess in which the bolster plate is confined with the exposed face of the bolster flush with front face portions of the handle bordering said depression, said bolster plate having such interengagement with the tang of the blade member at the opening through which the tang extends and such interengagement with the front face portion of the handle bordering said depression at the periphery of said bolster plate as to control the angularly oriented position of the blade about the longitudinal axis of the handle and adhesive material establishing a securely bonded connection between said tang and channel member and surfaces of said recess in the handle opposite thereto.

References Cited in the file of this patent

UNITED STATES PATENTS 1,512,920  Galvin _____ Oct. 28, 1924
2,072,581  Curtis _____ Mar. 2, 1937

FOREIGN PATENTS 1,084,070  France _____ June 30, 1954